US000001226H

United States Statutory Invention Registration [19]

[11] Reg. Number: H1226

[43] Published: Sep. 7, 1993

VanReenen et al.

[54] QUICK DISCONNECT COUPLING

[75] Inventors: Daniel R. VanReenen, Aberdeen; Jeffrey M. Matthews, Conowingo, both of Md.

[73] Assignee: The United States of America as represented by the Secretary of the Army, Washington, D.C.

[21] Appl. No.: 935,701

[22] Filed: Aug. 26, 1992

[51] Int. Cl.[5] ..... E03B 1/00

[52] U.S. Cl. ..... 137/614.04; 137/614.05; 137/614.06; 137/614.21

[58] Field of Search ..... 137/384, 798, 881, 614.04–614.06, 137/614.21

*Primary Examiner*—David H. Brown

*Attorney, Agent, or Firm*—Anthony T. Lane; Edward Goldberg; Michael Sachs

[57] ABSTRACT

A quick disconnect coupling device formed from a female coupling portion and a male portion for mating therewith. The outside diameter of the male portion is equal to the inside diameter of the female portion from the axial outer end of the male coupling to a point less than the total distance of penetration and a reduced outside diameter axially inward thereof. Each coupling portion has a valve to close the portions when they are disconnected. The coupling portions are configured to have a difference between the inside diameter of the female coupling portion and the reduced diameter of the male coupling. The female coupling portion is free to rotate about a point of maximum penetration by the male coupling portion to permit quick disconnection upon application of force to the outer end of either of the coupling portions. The edge of the male coupling portion may be tapered inwardly to assist in the rotation.

12 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

QUICK DISCONNECT COUPLING

The invention described herein may be made, used, or licensed by or for the Government for Governmental purposes without the payment to me of any royalties thereon or therefor.

FIELD OF THE INVENTION

The present invention relates to a quick disconnect coupling device and more particularly to a quick disconnect device which can be used in close environments and which does not require exclusively an axial force for disconnection.

BACKGROUND OF THE INVENTION

Disconnection devices and particularly quick disconnect devices are well known at the present time. With the introduction of air-cooled garments in aircraft and combat vehicles, for example, such as has happened in the mid 1970's, a need was created for a coupling between the garments worn in the vehicle and an air source. This connection is ideally such that it can be easily disconnected in the event that the soldier or aviator needed to make a hasty or rapid exit from the normal crew position.

In prior art designs, the individual connections needed to be manually uncoupled. In some cases, the connections were made so that a direct axial pull would bring about disconnection. In the first case, there is a direct action required. This might take place possibly during a time when the person is in a state of mental confusion, such as in a post-crash fire. An axial pull will require that the coupling be installed between two lengths of flexible hose in order to disconnect automatically. Clearly, neither solution is entirely satisfactory, particularly in aircraft and other vehicles where space is limited.

Accordingly, it is an object of this invention to provide a quick disconnect device for vehicles such as aircraft.

Another object of this invention is to provide a device which can be fastened directly to such vehicles.

Still another object of this invention is to provide a quick disconnect device which can be disconnected without exclusively a substantial axial force.

Other objects will appear hereinafter.

SUMMARY OF THE INVENTION

It has now been discovered that the above and other objects of the present invention may be accomplished in the following manner. Specifically, a quick disconnect coupling device has been discovered which comprises a female coupling portion and a male coupling portion.

The female coupling portion has an inside diameter extending axially inward for a predetermined distance. The male coupling portion has a coupling outside diameter sized for cooperation with said inside diameter. The outside diameter is substantially equal to the inside diameter from the axial outer end of the male coupling to a point less than the predetermined distance. The male portion has a reduced outside diameter axially inward thereof for the rest of the predetermined distance.

The device also includes a sealing valve in each of the female and male coupling portions. The sealing valve is biased in a closed position when the portions are disconnected and an open position when the coupling portions are mated. The female coupling portion may have a seal for sealing the coupling when the coupling portions are mated, particularly when high pressure is used.

The preferred embodiment includes coupling portions which are configured to have a difference between the inside diameter of the female coupling portion and the reduced diameter of the male coupling, whereby the mobile coupling portion is free to rotate about a point of maximum penetration by the other coupling portion to permit quick disconnection upon application of force to the outer end of either of said coupling portions. It should be noted that the male or the female portion may be fixed to the installation. The device also may include an inwardly tapered edge of the male coupling portion to assist in the rotation of the female coupling portion.

In another embodiment, the sealing valve comprises a conical plunger valve having a piston extending to the axial end of each coupling portion. The pistons are movable inwardly upon mating of the portions to open the valve, with the pistons being biased in a closed position by coil springs.

The device of this invention is admirably suited to applications where one of the coupling portions is fixedly mounted to a structure in the environment of intended use and the other of the coupling portions is mounted to an article of clothing for use in that environment.

BRIEF DESCRIPTION OF THE DRAWINGS

For a more complete understanding of the invention, reference is hereby made to the drawings, in which:

FIG. 1 is a side elevational view, partially in section of the female portion of the coupling device of this invention, shown along an axis of coupling;

DETAILED DESCRIPTION OF THE PREFERRED EMBODIMENT

Figures 1, 2:
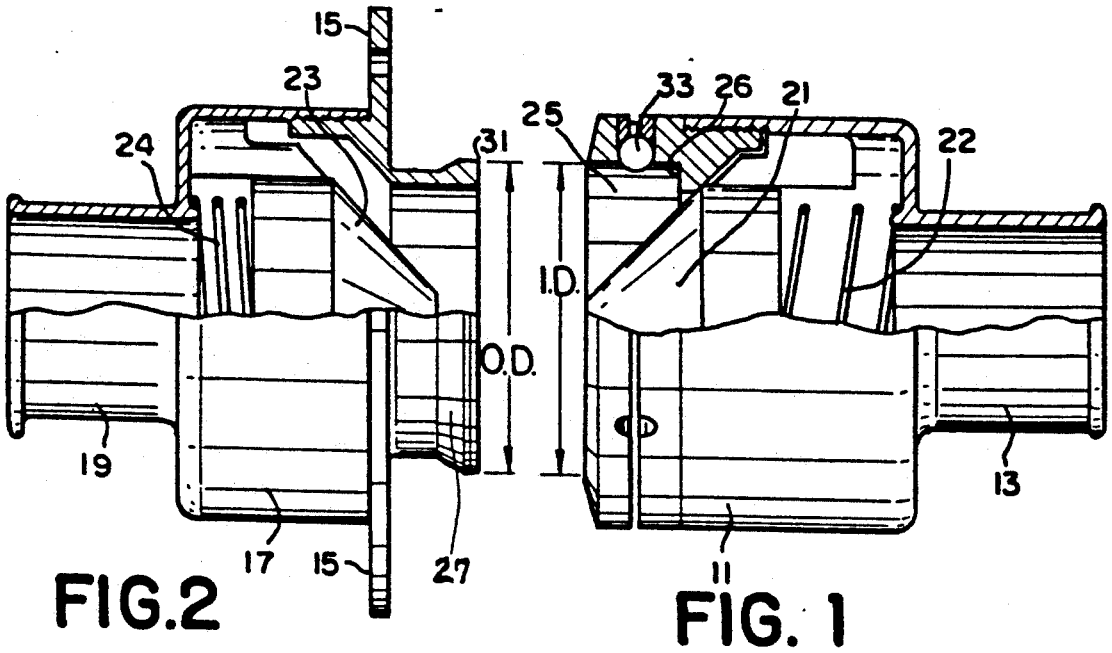
FIG. 1 illustrates
FIG. 2 is a side elevational view, partially in section of the male portion of the coupling device of this invention, shown along the same axis of coupling.

The female coupling portion 11 of the device of this invention is shown in FIG. 1, for connection a hose or tube, not shown, with fitting 13. Typical fittings 13 are sized to join flexible hose for air-cooled garments and the like. In FIG. 2, the male coupling portion 17 is attached to the structure 15, and male portion 17 also has a fitting 19 at one end, which is identical to fitting end 13. Although the male portion 17 is shown as mounted to the structure 15 in this embodiment, it is just as easy to mount the female portion 11 to structure. In some cases, neither portion will be fixedly attached to structure.

Female portion 11 has a conical piston seal 21 and spring 22, shown in the valve closed position in FIG. 1. The seal 21 is flush with the end of the portion 11 and is easily cleaned or decontaminated. Spring 22 is selected to provide the desired sealing force while permitting insertion of the male coupling as will be described.

Male portion 17 also has a conical piston seal 23 and spring 24, shown in the valve open position in FIG. 2. In the valve open configuration, spring 24 has been overcome by the insertion of male portion 17 into female portion 11, to provide a clear passage for the air-conditioning, or whatever is carried through the coupling device.

Male portion 17 fits into female portion 11 such that the open end 25 of female portion 11 has an inside diameter ID which is sized to accept made end 27 of male portion 17. Male end 27 has an outside diameter OD, and extends a distance h from the structure 15 or from the body of male portion 17. The male end 27 has a reduced outside diameter 29 at a point less than predetermined distance h, so that end 27 extends into open end 25, stopping at shoulder 26, again a distance h from the opening of the end.

Male end 27 also has a tapered edge 31, which is slightly smaller than the OD of end 27. End 27 is also sized to engage o-ring seal 33 which is mounted in open end 25 of female portion 11. Seal 33 allows a safe, sealed connection between portions 11 and 17 when end 27 is inserted into end 25 as described. Tests have shown that the connection is suitable for many if not all of the connections of previous connectors.

The present connector device is far superior to prior art designs when disconnection is effected. It is not necessary to pull axially to cause a disconnection because of the unique configuration. The female coupling portion 11 is free to rotate about a point of maximum penetration by male coupling portion 17 to permit quick disconnection upon application of force to the outer end of either of the coupling portion 11 and 17.

Figure 3:
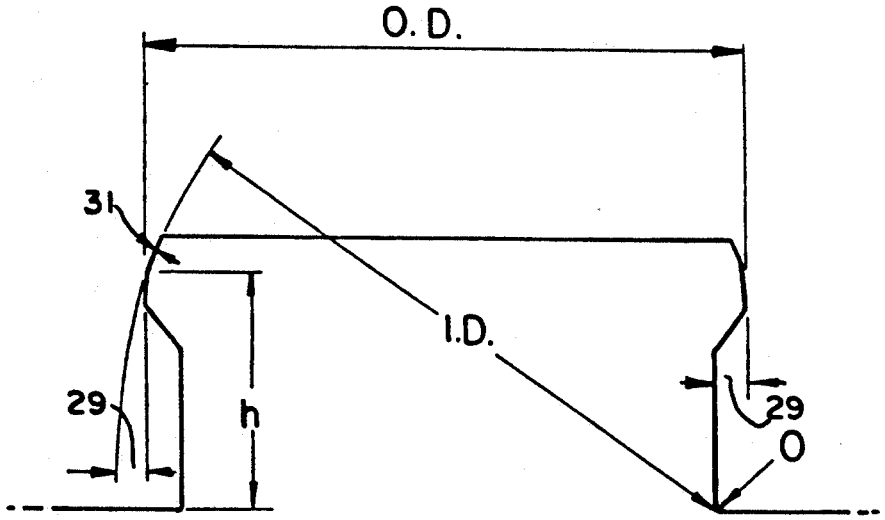
FIG. 3 is a schematic view showing the relationship of the various diameters of the coupling device and the relationship during the disconnection step.

As shown in FIG. 3, the ID of female portion 11 free to rotate about point O because the ID of portion 11 is less than the OD of portion 17 by the same distance that the reduced ID at 29 is less than the full ID of end 27. Tapered edge 31 defines a predetermined distance h which determines the maximum penetration of end 27 into open end 25. Therefore, the coupling will separate with a force applied above the predetermined height h.

Such a quick disconnect function has not been available in connecting devices in the past. Greatly increased safety and ease are the clear benefits from such a device. It is expected that the user will be able to disembark from the vehicle or location merely from the force of pulling beyond the allowed freedom of movement from the hose connected to end 13, for example. Both conical piston seals 21 and 23 will immediately seal the two portions 11 and 17 due to pressure from springs 22 and 24 respectively, thus protecting the integrity of the system and the user.

Various embodiments and features of the present invention have been shown in the foregoing. Other embodiments will also be seen without departing from the scope and spirit of the invention.

Having thus described the invention, what is claimed is:

1. A quick disconnect coupling device, comprising:

a female coupling portion having an inside diameter extending axially inward for a predetermined distance;

a male coupling portion for mating with said female portion and having a coupling outside diameter sized for cooperation with said inside diameter, said outside diameter being substantially equal to said inside diameter from the axial outer end of said male coupling to a point less than said predetermined distance and having a reduced outside diameter axially inward thereof for the rest of said predetermined distance; and sealing valve means in each of said female and male coupling portions, said sealing valve means being biased in a closed position when said portions are disconnected and an open position when said coupling portions are mated, said female coupling portion having sealed means for sealing said coupling when said coupling portions are mated.

2. The device of claim 1, wherein said sealing valve means comprises a conical plunger valve having a piston extending to the axial end of each coupling portion, said pistons being movable inwardly upon mating of said portions to open said valve means, said pistons being biased in a closed position by coil spring means.

3. The device of clam 1, wherein said coupling portions are configured to have a difference between said inside diameter of said female coupling portion and said reduced diameter of said male coupling, whereby said female coupling portion is free to rotate about a point of maximum penetration by said female coupling portion to permit quick disconnection upon application portions.

4. The device of claim 3, wherein the edge of said male coupling portion is tapered inwardly to assist in said rotation of said female coupling portion.

5. The device of claim 1, wherein one of said coupling portion is fixedly mounted to a structure of intended use.

6. The device of claim 5, wherein the other of said coupling portions is mounted to an article of clothing.

7. A quick disconnect coupling device, comprising:

a female coupling portion having an inside diameter extending axially inward for a predetermined distance;

a male coupling portion for mating with said female portion and having a coupling outside diameter sized for cooperation with said inside diameter, said outside diameter being substantially equal to said inside diameter from the axial outer end of said male coupling to a point less than said predetermined distance and having a reduced outside diameter axially inward thereof for the rest of said predetermined distance; and sealing valve means in each of said female and male coupling portions, said sealing valve means being biased in a closed position when said portions are disconnected and an open position when said coupling portions are mated, said female coupling portion having sealing means for sealing said coupling when said coupling portions are mated, said coupling portions being configured to have a difference between said inside diameter of said female coupling portion and said reduced diameter of said male coupling, whereby said female coupling portion is free to rotate about a point of maximum penetration by said female coupling portion to permit quick disconnection upon application of force to the outer end of either of said coupling portions.

8. The device of claim 7, wherein the edge of said male coupling portion is tapered inwardly to assist in said rotation of said female coupling portion.

9. The device of claim 7, wherein said sealing valve means comprises a conical plunger valve having a piston extending to the axial end of each coupling portion, said pistons being movable inwardly upon mating of said portions to open said valve means.

10. The device of claim 9, wherein said pistons are biased in a closed position by coil spring means.

11. The device of claim 7, wherein one of said coupling portions is fixedly mounted to a structure in the environment of intended use.

12. The device of claim 11, wherein the other of said coupling portions is mounted to an article of clothing for use in said environment.

* * * * *